(12) United States Patent
Ledroz et al.

(10) Patent No.: US 10,077,648 B2
(45) Date of Patent: Sep. 18, 2018

(54) SYSTEM AND METHOD FOR PROVIDING A CONTINUOUS WELLBORE SURVEY

(71) Applicant: GYRODATA, Incorporated, Houston, TX (US)

(72) Inventors: Adrián Guillermo Ledroz, Houston, TX (US); John Lionel Weston, Christchurch (GB)

(73) Assignee: Gyrodata, Incorporated, Houston, TX (US)

( * ) Notice: Subject to any disclaimer, the term of this patent is extended or adjusted under 35 U.S.C. 154(b) by 0 days.

(21) Appl. No.: 14/446,140

(22) Filed: Jul. 29, 2014

(65) Prior Publication Data
US 2016/0032709 A1 Feb. 4, 2016

(51) Int. Cl.
*E21B 47/022* (2012.01)
*E21B 7/04* (2006.01)
*E21B 7/10* (2006.01)
*G01C 19/02* (2006.01)

(52) U.S. Cl.
CPC .............. *E21B 47/022* (2013.01); *E21B 7/04* (2013.01); *E21B 7/10* (2013.01); *G01C 19/02* (2013.01)

(58) Field of Classification Search
CPC . E21B 47/022; E21B 7/04; E21B 7/10; G01C 19/02
USPC ........................................................ 73/152.54
See application file for complete search history.

(56) References Cited

U.S. PATENT DOCUMENTS

| | | | |
|---|---|---|---|
| 5,390,748 A * | 2/1995 | Goldman | E21B 7/04 175/24 |
| 5,452,518 A | 9/1995 | DiPersio | |
| 5,519,668 A * | 5/1996 | Montaron | G01V 3/20 175/45 |
| 5,657,547 A | 8/1997 | Uttecht et al. | |
| 5,806,195 A | 9/1998 | Uttecht et al. | |
| 5,821,414 A | 10/1998 | Noy et al. | |
| 6,179,067 B1 | 1/2001 | Brooks | |
| 6,209,391 B1 | 4/2001 | Dallas | |
| 6,347,282 B2 | 2/2002 | Estes et al. | |

(Continued)

FOREIGN PATENT DOCUMENTS

| | | |
|---|---|---|
| EP | 684490 A2 * | 5/1995 |
| EP | 0 684 490 A2 | 11/1995 |

OTHER PUBLICATIONS

EPO Examination and Search Report and Opinion; EP 15178946.8; dated Apr. 25, 2016.

(Continued)

*Primary Examiner* — John Fitzgerald
(74) *Attorney, Agent, or Firm* — Pramudji Law Group PLLC; Ari Pramudji (57) ABSTRACT

Systems and methods are provided for producing a continuous survey of a previously drilled portion of a wellbore. The method includes receiving a plurality of stationary survey measurements taken at a corresponding plurality of locations along the portion of the wellbore. The method further includes receiving at least one continuous survey including a plurality of continuous survey measurements taken between a pair of stationary survey measurements of the plurality of stationary survey measurements. The method further includes combining the plurality of stationary survey measurements and the plurality of continuous survey measurements to produce the continuous survey of the portion of the wellbore.

24 Claims, 8 Drawing Sheets

(56) References Cited

U.S. PATENT DOCUMENTS

| | | | |
|---|---|---|---|
| 6,405,808 B1* | 6/2002 | Edwards | E21B 47/022 175/45 |
| 6,529,834 B1 | 3/2003 | Estes et al. | |
| 6,633,816 B2 | 10/2003 | Shirasaka et al. | |
| 6,807,487 B2* | 10/2004 | Khan | G01V 1/40 367/905 |
| 6,877,241 B2* | 4/2005 | Barr | E21B 47/02208 33/1 H |
| 6,957,580 B2 | 10/2005 | Ekseth et al. | |
| 7,066,284 B2* | 6/2006 | Wylie | C09K 8/12 166/207 |
| 7,117,605 B2 | 10/2006 | Ekseth et al. | |
| 7,225,550 B2 | 6/2007 | Ekseth et al. | |
| 7,225,879 B2* | 6/2007 | Wylie | C09K 8/12 166/292 |
| 7,234,539 B2 | 6/2007 | Wright et al. | |
| 7,341,117 B2* | 3/2008 | Wylie | C09K 8/12 166/295 |
| 7,350,410 B2 | 4/2008 | Ekseth et al. | |
| 7,571,777 B2* | 8/2009 | Wylie | C09K 8/12 166/250.01 |
| 7,650,269 B2* | 1/2010 | Rodney | G01V 1/48 703/10 |
| 7,669,656 B2 | 3/2010 | Wright et al. | |
| 7,789,171 B2* | 9/2010 | Grayson | E21B 47/0006 175/40 |
| 8,011,446 B2* | 9/2011 | Wylie | C09K 8/12 175/22 |
| 8,292,005 B2* | 10/2012 | Grayson | E21B 47/0006 175/40 |
| 8,579,044 B2 | 11/2013 | Allen et al. | |
| 8,596,385 B2* | 12/2013 | Benson | E21B 7/04 175/26 |
| 2002/0060570 A1 | 5/2002 | Shirasaka et al. | |
| 2002/0188407 A1* | 12/2002 | Khan | G01V 1/40 702/16 |
| 2003/0037963 A1* | 2/2003 | Barr | E21B 47/02208 175/40 |
| 2004/0149431 A1* | 8/2004 | Wylie | C09K 8/12 166/242.1 |
| 2005/0241855 A1* | 11/2005 | Wylie | C09K 8/12 175/45 |
| 2007/0187146 A1* | 8/2007 | Wylie | C09K 8/12 175/45 |
| 2008/0087423 A1* | 4/2008 | Wylie | C09K 8/12 166/254.2 |
| 2008/0164063 A1* | 7/2008 | Grayson | E21B 47/0006 175/45 |
| 2009/0078413 A1 | 3/2009 | Tubel et al. | |
| 2009/0308616 A1* | 12/2009 | Wylie | C09K 8/12 166/380 |
| 2010/0193246 A1* | 8/2010 | Grayson | E21B 47/0006 175/45 |
| 2012/0245850 A1* | 9/2012 | Bang | E21B 47/022 702/9 |
| 2015/0240620 A1 | 8/2015 | Bang et al. | |
| 2015/0240622 A1 | 8/2015 | Bang et al. | |
| 2015/0369042 A1* | 12/2015 | Samuel | E21B 43/10 702/9 |

OTHER PUBLICATIONS

Weston, et al.; New Gyro Drilling Technology Delivers Accurate Azimuth and Real-Time Quality Control for All Well Trajectories; IADC/SPR Drilling Conference and Exhibition; Mar. 2014.

Brown, et al.; High-Angle Gyro-While-Drilling Technology Delivers an Economical Solution to Accurate Wellbore Placement and Collision Avoidance in High-Density Multilateral Pad Drilling in The Canadian Oil Sands; IADC/SPE Drilling Conference and Exhibition; Mar. 2012.

Uttecht, et al.; Survey Accuracy is Improved by a New, Small OD Gyro; World Oil; Mar. 1983.

EPO Examination Report; EP 15178946.8; dated Dec. 19, 2017.

Schlumberger; PZIG 675 Specifications / Data Sheet; 2013. https://www.slb.com/~media/Files/drilling/product_sheets/mwd/pathfinder_mwd/pzig_675_ps.pdf.

PCT International Search Report and Written Opinion; PCT/US2018/021175; dated Jun. 26, 2018.

* cited by examiner

SYSTEM AND METHOD FOR PROVIDING A CONTINUOUS WELLBORE SURVEY

BACKGROUND

Field of the Application

The present application relates generally to surveys of wellbores, and more particularly, to systems and methods for using continuous survey measurements between stationary gyrocompassing survey measurements to produce a continuous wellbore survey for wellbores for oil field and gas field exploration and development.

Description of the Related Art

A survey tool configured to be used in a wellbore can comprise at least one gyroscopic sensor configured to provide at least one data signal indicative of the orientation of the survey tool relative to the rotation axis of the Earth. For example, the at least one gyroscopic sensor can comprise a rate gyroscope (e.g., a spinning gyroscope, typically with the spin axis substantially parallel to the wellbore). The rate gyroscope undergoes precession as a consequence of the Earth's rotation. The rate gyroscope is configured to detect the components of this precession and to generate at least one corresponding data signal indicative of the orientation of the rate gyroscope's spin axis relative to the Earth's axis of rotation. By measuring this orientation relative to the Earth's axis of rotation, the rate gyroscope can determine the orientation of the survey tool relative to true north. Such rate gyroscopes can be used in a gyrocompassing mode while the survey tool is relatively stationary. In certain systems, the survey tool (e.g., a measurement-while-drilling or MWD survey tool) can be part of a steerable drilling tool, and can be used in a gyrosteering mode while drilling is progressing.

SUMMARY

In one aspect of the disclosure, a method is provided for producing a continuous survey of a previously drilled portion of a wellbore. The method comprises receiving a plurality of stationary survey measurements taken at a corresponding plurality of locations along the portion of the wellbore. The method further comprises receiving at least one continuous survey comprising a plurality of continuous survey measurements taken between a pair of stationary survey measurements of the plurality of stationary survey measurements. The method further comprises combining the plurality of stationary survey measurements and the plurality of continuous survey measurements to produce the continuous survey of the portion of the wellbore.

In another aspect of the disclosure, a method is provided for generating data for a continuous survey of a previously drilled portion of a wellbore. The method comprises taking a plurality of stationary survey measurements at a corresponding plurality of locations along the portion of the wellbore. The method further comprises taking at least one continuous survey comprising a plurality of continuous survey measurements between a pair of stationary survey measurements of the plurality of stationary survey measurements.

In another aspect of the disclosure, a wellbore survey system is provided. The system comprises at least one first survey tool configured to perform stationary survey measurements at a first level of performance. The system further comprises at least one second survey tool configured to perform continuous survey measurements at a second level of performance lower than the first level of performance.

BRIEF DESCRIPTION OF THE DRAWINGS

Various configurations are depicted in the accompanying drawings for illustrative purposes, and should in no way be interpreted as limiting the scope of the systems or methods described herein. In addition, various features of different disclosed configurations can be combined with one another to form additional configurations, which are part of this disclosure. Any feature or structure can be removed, altered, or omitted. Throughout the drawings, reference numbers may be reused to indicate correspondence between reference elements.

DETAILED DESCRIPTION

Although certain configurations and examples are disclosed herein, the subject matter extends beyond the examples in the specifically disclosed configurations to other alternative configurations and/or uses, and to modifications and equivalents thereof. Thus, the scope of the claims appended hereto is not limited by any of the particular configurations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain configurations; however, the order of description should not be construed to imply that these operations are order-dependent. Additionally, the structures, systems, and/or devices described herein may be embodied as integrated components or as separate components. For purposes of comparing various configurations, certain aspects and advantages of these configurations are described. Not necessarily all such aspects or advantages are achieved by any particular configuration. Thus, for example, various configurations may be carried out in a manner that achieves or optimizes one advantage or group of advantages as taught herein without necessarily achieving other aspects or advantages as may also be taught or suggested herein.

In the discussion herein, attention is focused on certain embodiments in which systems and methods are used in conjunction with gyrocompassing survey measurements (e.g., gyroscopic measurements taken while the survey tool is substantially stationary to measure rotations due to the Earth's rotation). The systems and methods described herein may be used in conjunction with survey tools for taking certain types of static/gyrocompassing wellbore surveys, including, but not limited to, wireline survey tools, slick line survey tools (e.g., tools for surveys run on a wireline without communication to the surface), and drop survey tools.

The surveys of the previously drilled portion of the wellbore can be taken by a survey tool either as the survey tool is inserted into (e.g., an inrun survey) or extracted from (e.g., an outrun survey) the portion of the wellbore after the portion of the wellbore has been drilled. In addition, the surveys of the previously drilled portion of the wellbore can be taken during an outrun survey, for example, using sensors that are part of a gyro-while-drilling (GWD) drill string or a measurement-while-drilling (MWD) drill string that is used to drill the wellbore, and the sensors of the GWD or MWD drill string are used to take measurements while the drill string is extracted from the wellbore (as opposed to being used while the drill string is drilling the wellbore and being extended downward along the wellbore) after the portion of the wellbore has been drilled. In certain embodiments, the sensors used to take the plurality of continuous survey measurements are located in a portion of the drill string that rotates as drilling is performed.

As with other downhole measurement systems and methods, in certain embodiments described herein, the situation downhole is not known precisely, and failure of the survey tool to become totally static when measurement data are collected may degrade the accuracy of the survey. However, due to the measurements being taken of a previously drilled portion of the wellbore, the results of the analysis described herein are not available while the portion of the wellbore is being drilled. Instead, the results of the analysis described herein are available after the portion of the wellbore has been drilled but before further activity involving the portion of the wellbore.

For example, it can be desirable to accurately determine the true path or trajectory of a previously drilled wellbore, including portions of the wellbore having significant deviations from the predetermined plan for the wellbore path. Different drilling methods may result in more deviations than others (e.g., paths that have more tortuous trajectories than others), and detailed data regarding the wellbore path or trajectory which takes account of short-term perturbations in the wellbore path can be desirable for a number of reasons, including, but not limited to the identification of low-tortuosity sections for permanent installation of completion or production equipment, and the identification of high-tortuosity sections in which rod guide wear sleeve equipment is to be placed to increase rod and casing life and to reduce workover frequency. Furthermore, detailed knowledge of well tortuosity may help the evaluation of the drilling equipment and process, in particular the steering while drilling performance, and for extended reach drilling. In certain embodiments, the systems and methods described herein advantageously provide a very precise and detailed continuous survey of a previously drilled portion of a wellbore, taking account of "micro-tortuosity" of the wellbore trajectory.

Current gyroscopic survey techniques include stationary and continuous techniques. When taking a gyrocompassing survey measurement within a wellbore, it is desirable that the survey tool remains perfectly stationary with respect to the Earth while the data is collected. Being stationary ensures that the at least one gyroscopic sensor module of the survey tool is subject only to the rotational motion of the Earth while the measurements are being made. Stationary gyroscopic surveys typically have sequential gyrocompassing measurements taken at positions within the wellbore that are spaced from one another by pipe or stand length intervals (e.g., 30-90 feet), with these measurements being used to determine wellbore inclination and azimuth. Positional data can be derived by combining the angular information from the gyrocompassing measurements with measurements of the depth of the survey tool along the wellbore using a curve-fitting process to establish the trajectory of the wellbore. Continuous gyroscopic surveys are typically implemented by measuring the changes in inclination and azimuth at more frequent intervals along the wellbore (e.g., one foot), and the absolute inclination and azimuth values can be derived by summing the incremental changes from a known initial orientation. The initial orientation can be established at a reference down-hole position using at least one gyrocompassing survey, or at a reference surface position using fore sighting methods or other sources of attitude data that can be made available above-ground, including, but not limited to, satellite navigation data.

Continuous gyroscopic surveys, in which individual survey stations are taken at frequent intervals (e.g., successive positions spaced from one another by distances along the wellbore in a range between one foot and five feet), are subject to measurement drifts which can propagate and increase in size over long wellbore sections, giving rise to significant azimuth and positional inaccuracies. One existing method of offsetting the effects of such survey measurement drift is to perform drift corrections based on the comparison of inrun survey measurements (e.g., survey measurements taken while the survey tool is moved downward along the wellbore) and outrun survey measurements (e.g., survey measurements taken while the survey tool is moved upward along the wellbore) taken at common positions in the wellbore. An alternative technique is to conduct gyrocompassing surveys at intervals along the wellbore path and to use the resulting information to initialize successive continuous survey sections over shorter depth intervals. In such techniques, the length intervals between these successive continuous survey sections are in a range from 500 to 600 meters, corresponding to approximately 20 minutes duration for typical wireline run operations.

In certain embodiments described herein, a method is provided which combines frequent static survey measurements (e.g., at intervals of 90 feet) with continuous survey measurements taken between the successive static survey measurements. For example, certain embodiments described herein can be used for battery run operations, in which the survey tool traverses the wellbore on a slick line. However, certain embodiments described herein are applicable for any other wireline survey technique as well.

Figure 1A:
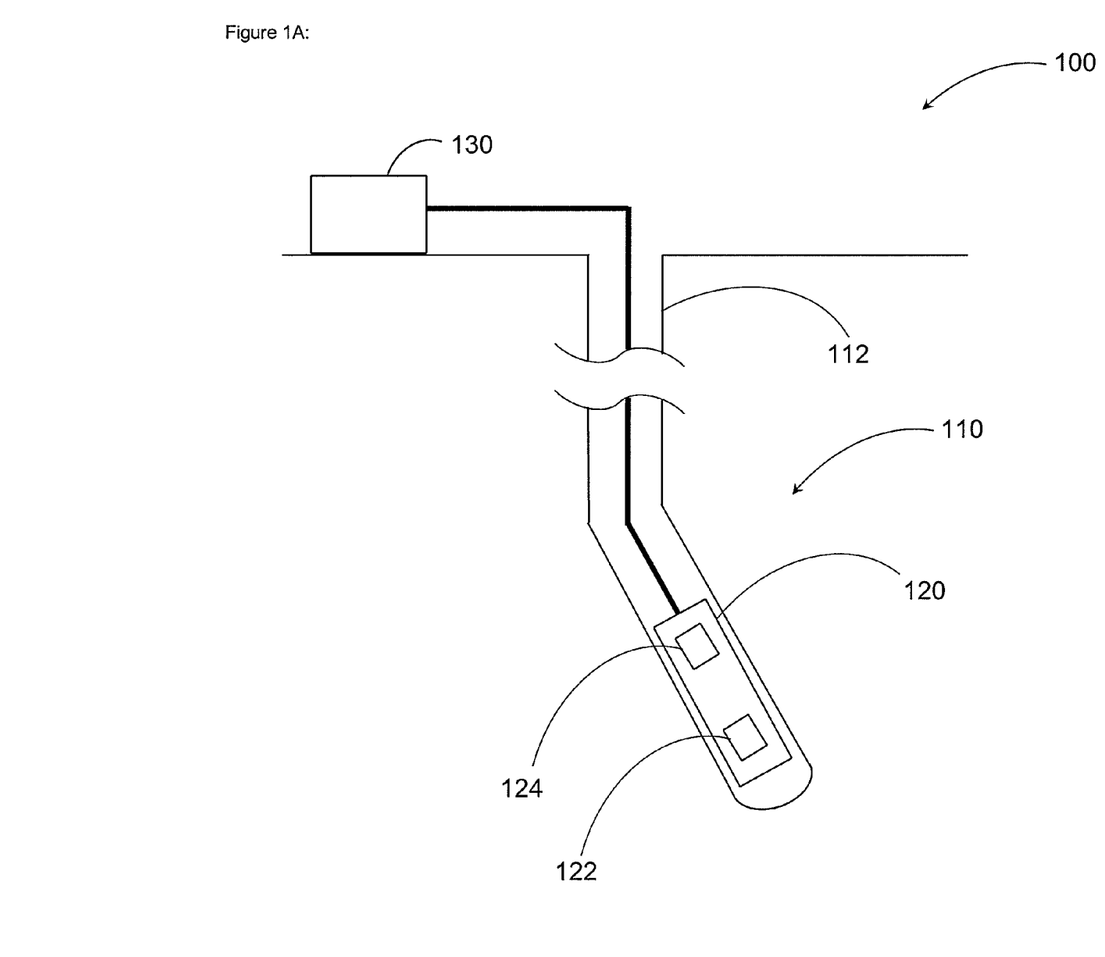
FIG. 1A schematically illustrates an example system in accordance with certain embodiments described herein.

FIG. 1A schematically illustrates an example system 100 in accordance with certain embodiments described herein. The system 100 comprises a tool string 110 configured to be within a wellbore 112 and comprising at least one survey tool 120 configured to perform survey measurements. The system 100 further comprises at least one processor 130 configured to receive signals from the at least one survey tool 120 and to operate in accordance with certain embodiments described herein.

The at least one survey tool 120 can comprise at least one gyro-while-drilling (GWD) survey tool, at least one measurement-while-drilling (MWD) survey tool, or both. In certain embodiments, as schematically illustrated in FIG. 1A, the at least one survey tool 120 can comprise one survey tool 120 comprising at least one gyroscopic sensor module 122 and at least one accelerometer module 124. In certain such embodiments, the gyroscopes and accelerometers of the one survey tool 120 can be used to perform a combination of the stationary survey measurements and the continuous survey measurements, as described more fully below.

Figure 1B:
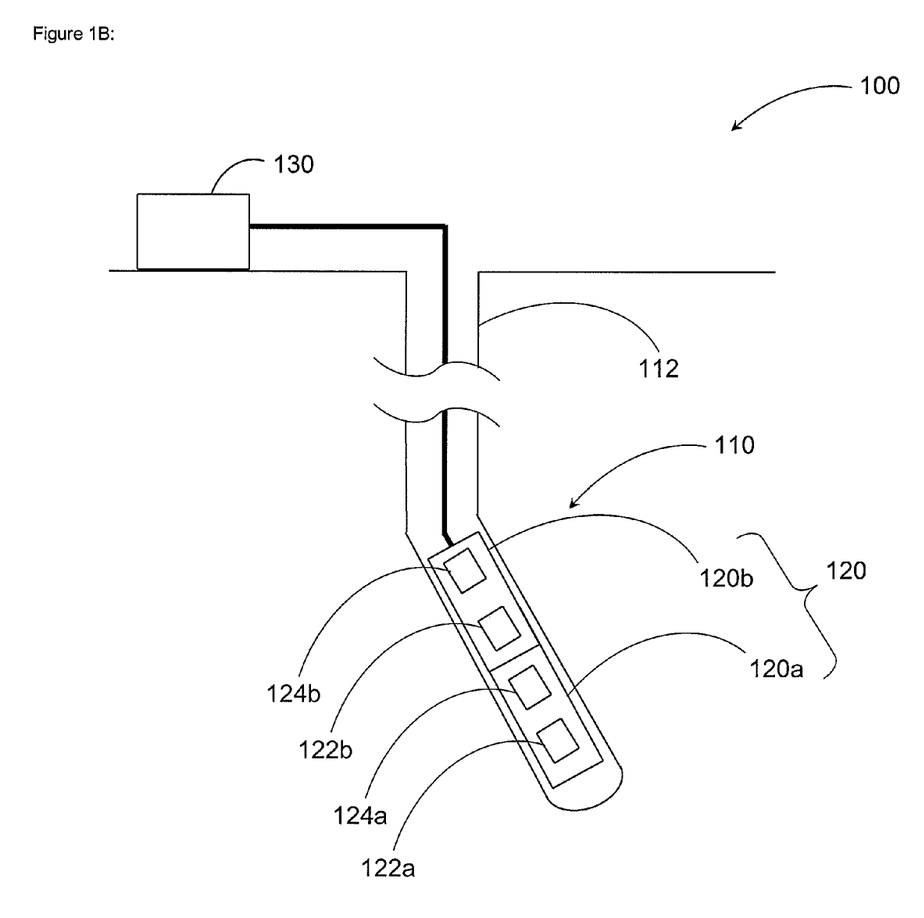
FIG. 1B schematically illustrates another example system in accordance with certain embodiments described herein.

FIG. 1B schematically illustrates an example system 100 in which the at least one survey tool 120 comprises a first survey tool 120a and a second survey tool 120b in accordance with certain embodiments described herein. In certain such embodiments, one of the first survey tool 120a and the second survey tool 120b can be used to perform the stationary survey measurements (e.g., high performance gyrocompassing measurements). The other one of the first survey tool 120a and the second survey tool 120b can be used to perform the continuous survey measurements (e.g., lower grade measurements), keeping track of inclination and azimuth changes between the stationary survey measurements, as described more fully below. The stability and repeatability of the gyroscopic measurements are examples of parameters that can be used in determining the level of performance of a downhole gyrocompassing survey system. For example, gyrocompassing measurements can be characterized as being high performance when the combination of all gyroscopic measurement errors is less than 0.1 degree per hour. Using sensors that provide lower grade measurements (e.g., with measurement uncertainties in a range of 5-10 degrees per hour), it can become more difficult to achieve the desired level of measurement stability and repeatability for precision surveying. In certain other embodiments, the continuous survey measurements can be performed using a survey tool that has the same or higher accuracy than does the survey tool used to perform the stationary survey measurements.

The at least one survey tool 120 comprises at least one gyroscopic sensor module 122 configured to generate signals indicative of measurements of the rotation rate to which the at least one gyroscopic sensor module 122 is exposed. In the example system 100 of FIG. 1B, the at least one gyroscopic sensor module 122 comprises at least one gyroscopic sensor module 122a (e.g., dedicated to stationary survey measurements) of the first survey tool 120a and at least one gyroscopic sensor module 122b (e.g., dedicated to continuous survey measurements) of the second survey tool 120b.

The at least one gyroscopic sensor module 122 can comprise one or more gyroscopes that are dedicated to stationary survey measurements of the Earth's rotation vector (e.g., gyrocompassing survey measurements). For example, the at least one gyroscopic sensor module 122 can comprise one or more gyroscopes selected from the group consisting of: spinning wheel gyroscopes, optical gyroscopes, and Coriolis vibratory sensors (e.g., MEMS vibratory sensors). Example gyroscopic sensors compatible with embodiments described herein are described more fully in "Survey Accuracy is Improved by a New, Small OD Gyro," G. W. Uttecht, J. P. deWardt, World Oil, March 1983; U.S. Pat. Nos. 5,657,547, 5,821,414, and 5,806,195. These references are incorporated in their entireties by reference herein. Other examples of gyroscopic sensors are described by U.S. Pat. Nos. 6,347,282, 6,957,580, 7,117,605, 7,225,550, 7,234,539, 7,350,410, and 7,669,656 each of which is incorporated in its entirety by reference herein. The at least one gyroscopic sensor module 122 is advantageously capable of providing measurements of turn rate to the desired accuracy (e.g., in a range from 0.01°/hour to 0.05°/hour). The at least one gyroscopic sensor module 122 is advantageously sufficiently small to be accommodated in a down hole tool (e.g., within the confines of a 1¾-inch pressure case), capable of operating over the expected temperature range (e.g., −20° C. to +150° C., or greater), and capable of surviving the down hole vibration and shock environment that may be encountered within the wellbore.

The at least one gyroscopic sensor module 122 can further comprise one or more gyroscopes that are dedicated to continuous measurements of changes in orientation in addition to changes of the Earth's rotation vector. For example, the at least one gyroscopic sensor module 122 can comprise one or more MEMS gyroscopes, or other gyroscopes compatible with measuring angular changes in inclination and azimuth over the relatively short periods of time (e.g., one second) that the at least one survey tool 120 would take to move between successive stationary survey positions (e.g., 90 feet). The performance specifications for these gyroscopes are much less demanding, for example, a rate measurement bias stability in the range of 5-10°/hour is adequate. Gyroscopic sensors configured to provide the continuous survey measurements can be relatively small and inexpensive to install in the at least one survey tool 120. In certain embodiments, the one or more gyroscopes dedicated to continuous survey measurements can be installed alongside the one or more gyroscopes dedicated to stationary survey measurements (e.g., in a single tool 120). In certain other embodiments, the one or more gyroscopes dedicated to continuous survey measurements can be mounted in a second gyroscopic sensor module (e.g., gyroscopic sensor module 122b) that is separate but mechanically coupled (e.g., screwed) to a first gyroscopic sensor module (e.g., gyroscopic sensor module 122a) comprising the one or more gyroscopes dedicated to stationary survey measurements.

The at least one survey tool 120 further comprises at least one accelerometer module 124 configured to generate a second one or more signals indicative of measurements of the Earth's gravitation vector at the at least one accelerometer module 124. For example, the at least one accelerometer module 124 can comprise one or more accelerometers that are configured to measure the Earth's gravitation vector (e.g., a triad of accelerometers that provide signals indicative of three orthogonal components of the Earth's gravitation vector at the position of the at least one accelerometer module 124). In certain embodiments, the at least one accelerometer module 124 comprises one or more cross-axial accelerometers configured to sense two or more components of the Earth's gravitation vector.

In certain embodiments, the at least one accelerometer module 124 comprises two or more single-axis accelerometers, one or more two-axis accelerometers, and/or one or more three-axis accelerometers. Various types of accelerometer sensors are capable of providing a desired level of measurement accuracy and resolution compatible with certain embodiments described herein. Examples include, but are not limited to, quartz flexure accelerometer sensors and MEMS devices. The measurement range may be in excess of ±1 g (e.g., in a range between ±1.2 g and ±1.5 g). The accelerometer sensors are advantageously sufficiently small to be accommodated in a down hole tool (e.g., within the confines of a 1¾-inch pressure case), capable of operating over the expected temperature range (e.g., −20° C. to +150° C., or greater), and capable of surviving the down hole vibration and shock environment that may be encountered within the wellbore.

The resolution and precision of the at least one accelerometer sensors can depend on the time and the desired angular rate uncertainty. For example, for errors below a maximum error on the toolface rate of 0.05°/hour over 15 seconds, the at least one accelerometer can provide noise levels below 0.14 mG. An analog-to-digital system with a range of ±1.2 G and 16 bits can give a resolution of 0.036 mG/count, which can satisfy the desired noise levels. If the time is increased, the accelerometer uncertainty can be increased as well.

In certain embodiments, the at least one accelerometer module 124 comprises a plurality of accelerometers that is part of either a gyro-while-drilling (GWD) survey tool or a measurement-while-drilling (MWD) survey tool (e.g., for determining the inclination and tool face angles at various positions along the wellbore being surveyed). In certain other embodiments, the at least one accelerometer module 124 comprises different pluralities of accelerometers. For example, the at least one accelerometer module 124 can comprise one or more accelerometers that are dedicated to measurements of the Earth's gravitation vector during times at which the survey tool is used for gyrocompassing and one or more accelerometers that are not used for gyrocompassing.

The at least one processor 130 of the example system 100 of FIGS. 1A and 1B (e.g., one or more micro-processors, a standard personal computer) is configured to receive signals from the at least one gyroscopic sensor module 122 and from the at least one accelerometer sensor module 124 of the at least one survey tool 120. In certain embodiments, the at least one processor 130 is located at or above the Earth's surface (e.g., as schematically illustrated by FIGS. 1A and 1B), or is located within the survey tool 120 within the wellbore. In some embodiments, a portion of the at least one processor 130 is located at or above the Earth's surface, and another portion of the at least one processor 130 is located within the wellbore and is communicatively coupled to the portion at or above the Earth's surface.

The at least one processor 130 can comprise one or more hardware processors in communication with at least one computer-readable memory that stores software modules including instructions that are executable by the one or more hardware processors. The software modules can include one or more software modules configured to receive a first plurality of signals from the at least one gyroscopic module 122 of the survey tool 120, to receive a second plurality of signals from the at least one accelerometer sensor module 124 of the survey tool 120, and to use the first plurality of signals and the second plurality of signals in accordance with certain embodiments described herein. In certain embodiments, a non-transitory computer storage can be provided having stored thereon a computer program that instructs a computer system (e.g., the at least one processor 130) to perform one or more methods compatible with certain embodiments described herein.

In certain embodiments, the at least one processor 130 is part of a controller generally configured to control and/or monitor the operation of the tool string 110 or portions thereof, with the controller comprising hardware, software, or a combination of both hardware and software. For example, in certain embodiments in which the tool string 110 comprises a drill string, the at least one processor 130 can be further configured to determine the current orientation or the trajectory of the drill string within the wellbore 112. The at least one processor 130 can further be configured to communicate with a memory subsystem configured to store appropriate information, such as orientation data, data obtained from one or more sensor modules on the drill string, etc.

In certain embodiments, the at least one processor 130 provides a real-time processing analysis of the signals or data obtained from various sensors of the at least one survey tool 120. In certain such real-time processing embodiments, data obtained from the various sensor modules are analyzed in real-time. In certain embodiments, at least a portion of the data obtained from the various sensor modules is saved in memory for analysis by the at least one processor 130. The at least one processor 130 of certain such embodiments comprises sufficient data processing and data storage capacity to perform the real-time analysis. In certain other embodiments, rather than being performed in real-time, the analysis is performed after the surveys have been taken (e.g., post-processing), and the at least one processor 130 comprises sufficient data processing and data storage capacity to perform such post-processing of the previously-obtained surveys.

Certain embodiments described herein can advantageously determine the shape (e.g., trajectory) of the wellbore between successive stationary surveys using a relatively small and inexpensive continuous gyro system (e.g., MEMS gyros) which can include gyros that are of a significantly lower grade than those utilized to generate a definitive survey in conventional surveying systems and operations. Certain embodiments described herein are applicable for different modes of survey operation. For example, for systems run on electrical wireline, both gyrocompassing and continuous data sets can be transmitted to the surface and a computer at the surface can combine the data appropriately. For another example, such processes can be carried out downhole and the final survey results can be transmitted to the surface. For slick line and drop tool operations, data can be downloaded at the surface after the tool has been retrieved from the wellbore, and data processing can then be performed at the surface.

Figure 2:
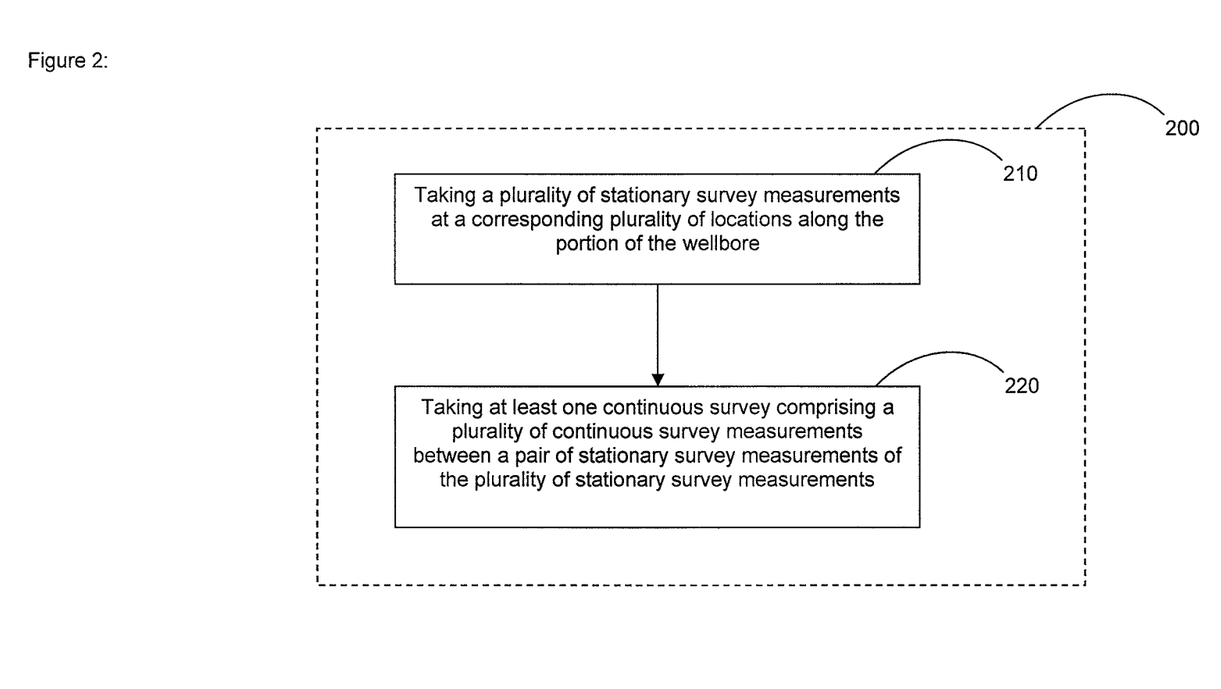
FIG. 2 is a flow diagram of an example method for generating data to be used in producing a continuous wellbore survey of a previously drilled portion of a wellbore in accordance with certain embodiments as described herein.

FIG. 2 is a flow diagram of an example method 200 for generating data for a continuous survey of a previously drilled portion of a wellbore in accordance with certain embodiments as described herein. In an operational block, 210, the method 200 comprises taking a plurality of stationary survey measurements 212 at a corresponding plurality of locations along the portion of the wellbore. In an operational block 220, the method 200 further comprises taking at least one continuous survey 214 comprising a plurality of continuous survey measurements 216 between a pair of stationary survey measurements 212 of the plurality of stationary survey measurements 212.

In certain embodiments, taking the plurality of stationary survey measurements 212 is performed using at least one survey tool (e.g., the at least one survey tool 120 as described herein), and taking the at least one continuous survey 214 is performed using the at least one survey tool. The at least one survey tool can comprise at least one gyroscopic sensor module (e.g., the at least one gyroscopic sensor module 122 as described herein) and at least one accelerometer sensor module (e.g., the at least one accelerometer sensor module 124 as described herein). For example, the at least one gyroscopic sensor module can comprise at least one gyroscopic sensor module that is configured (e.g., dedicated) to performing stationary survey measurements of the Earth's rotation vector (e.g., gyrocompassing survey measurements) and at least one gyroscopic sensor module configured (e.g., dedicated) to performing continuous survey measurements of the Earth's rotation vector (e.g., one or more MEMS gyroscopes). The at least one accelerometer sensor module can comprise at least one accelerometer sensor module that is configured (e.g., dedicated) to measure the Earth's gravitation vector (e.g., as described herein). In certain embodiments, taking the plurality of stationary survey measurements 212 comprises transmitting data from the plurality of stationary survey measurements 212 to a computer system comprising at least one processor (e.g., the at least one processor 130 as described herein), and taking the at least one continuous survey 214 comprises transmitting data from the plurality of continuous survey measurements 216 to the computer system.

In certain embodiments, the at least one survey tool (e.g., the at least one gyroscopic sensor module 122 and the at least one accelerometer sensor module 124) can be moved throughout the wellbore survey operation (e.g., located at sequential positions in an inrun direction downward along the wellbore, located at sequential positions in an outrun direction upward along the wellbore, or both) for performing the stationary survey measurements and the continuous survey measurements. The resulting inrun datasets, the outrun datasets, or both can be transmitted to the computer system and stored by the computer system. In certain embodiments, one or more of the datasets can be transmitted to the computer system while the at least one survey tool is being moved along the wellbore, while in certain other embodiments, one or more of the datasets can be transmitted to the computer system from the at least one survey tool upon retrieval of the at least one survey tool at the Earth's surface, after which the datasets can be processed to produce the combined survey in accordance with certain embodiments described herein.

Figure 3:
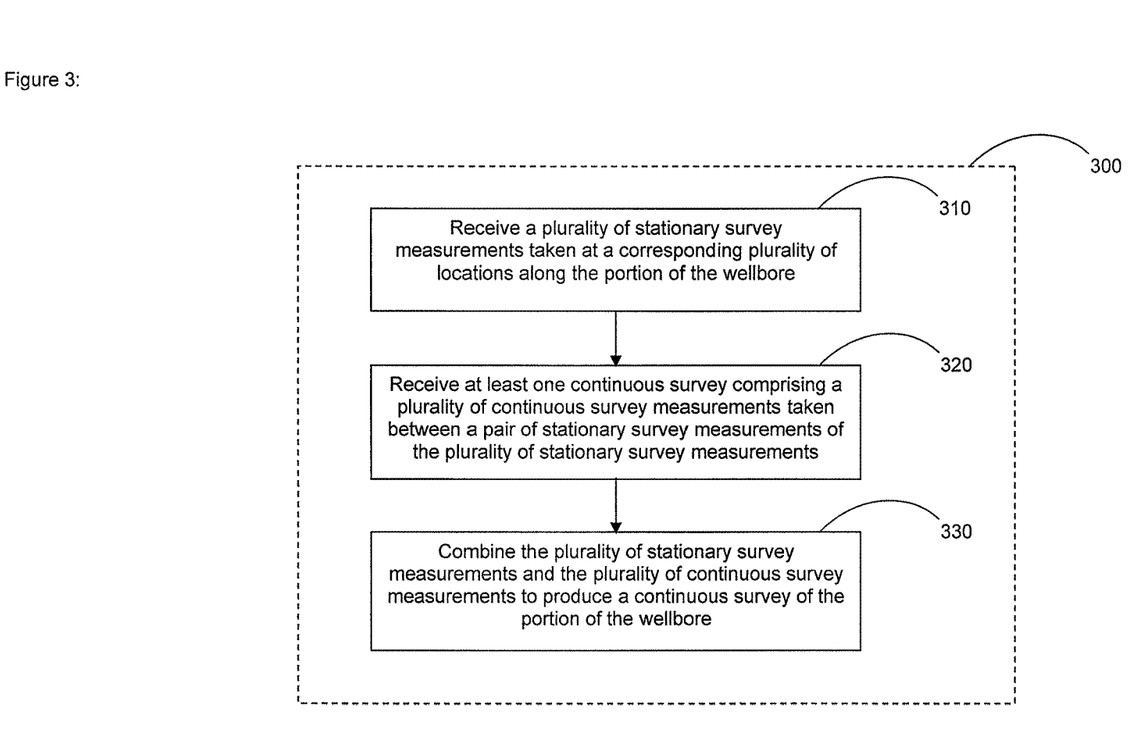
FIG. 3 is a flow diagram of an example method for producing a continuous wellbore survey of a previously drilled portion of a wellbore in accordance with certain embodiments described herein.

FIG. 3 is a flow diagram of an example method 300 for producing a continuous survey of a previously drilled portion of a wellbore in accordance with certain embodiments described herein. In an operational block 310, the method 300 comprises receiving a plurality of stationary survey measurements 212 (e.g., a plurality of gyrocompassing survey measurements) taken at a corresponding plurality of locations along the portion of the wellbore. In an operational block 320, the method 300 further comprises receiving at least one continuous survey 214 comprising a plurality of continuous survey measurements 216 taken between a pair of stationary survey measurements 212 of the plurality of stationary survey measurements 212. In an operational block 330, the method 300 further comprises combining the plurality of stationary survey measurements 212 and the plurality of continuous survey measurements 216 to produce a continuous survey of the portion of the wellbore.

In certain embodiments, receiving the plurality of stationary survey measurements 212 in the operational block 310 comprises taking the plurality of stationary survey measurements 212 (e.g., as in the operational block 210) using the at least one survey tool. In certain embodiments, receiving the at least one continuous survey 214 in the operational block 320 comprises taking the at least one continuous survey 214 (e.g., as in the operational block 220) using the at least one survey tool. In certain embodiments, combining the plurality of stationary survey measurements 212 and the plurality of continuous survey measurements 216 in the operational block 330 comprises using a computer system comprising at least one processor (e.g., the at least one processor 130 described herein), the computer system having received the plurality of stationary survey measurements 212 taken by and transmitted from the at least one survey tool and the plurality of continuous survey measurements 216 taken by and transmitted from the at least one survey tool.

In certain embodiments, the at least one continuous survey 214 comprises continuous survey measurements 216 taken between a pair of sequential stationary survey measurements 212 spaced from one another by a distance along the wellbore in a range of 30 feet to 270 feet (e.g., 90 feet, 180 feet, a length corresponding to one pipe length of the wellbore, a length corresponding to two pipe lengths of the wellbore, a length corresponding to three pipe lengths of the wellbore).

Figure 4A:
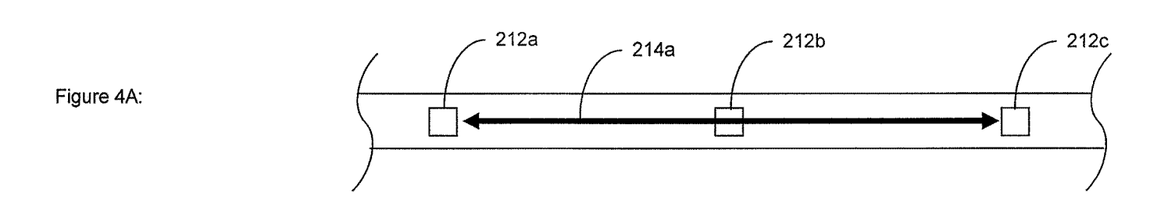
FIGS. 4A-4E schematically illustrate various examples of the stationary survey measurements and the continuous surveys in accordance with certain embodiments described herein.

FIGS. 4A-4E schematically illustrate various examples of the stationary survey measurements 212 and the continuous surveys 214 in accordance with certain embodiments described herein. In certain embodiments, the at least one continuous survey 214 comprising continuous survey measurements 216 taken between the pair of stationary survey measurements 212 spans across (e.g., includes) the location of at least one stationary survey measurement 212 (e.g., there are one or more stationary survey measurements 212 between the pair of stationary survey measurements 212). For example, as schematically shown in FIG. 4A, the continuous survey 214a comprising continuous survey measurements 216 taken between the pair of stationary survey measurements 212a, 212c spans across (e.g., includes) the location of the stationary survey measurement 212b. In certain other embodiments, the at least one continuous survey 214 spans across (e.g., includes) the location of two or more stationary survey measurements 212.

Figure 4B:
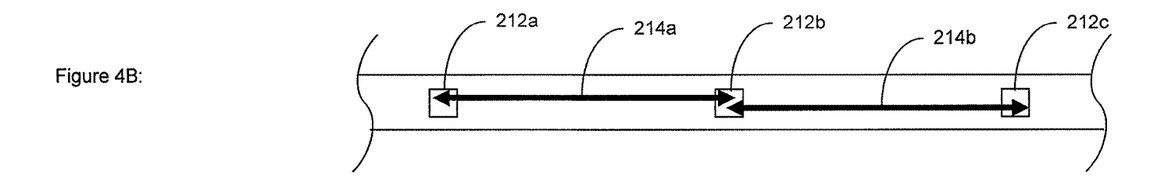

For another example, as schematically shown in FIG. 4B, the continuous survey 214a comprising continuous survey measurements 216 taken between the pair of stationary survey measurements 212a, 212b spans across (e.g., includes) the locations of the stationary survey measurements 212a, 212b, and the continuous survey 214b comprising continuous survey measurements 216 taken between the pair of stationary survey measurements 212a, 212c spans across (e.g., includes) the locations of the stationary survey measurements 212b, 212c. In other words, the continuous survey 214 can include the locations of the pair of stationary survey measurements 212 that at least a portion of the continuous survey 214 is between.

Figure 4C:
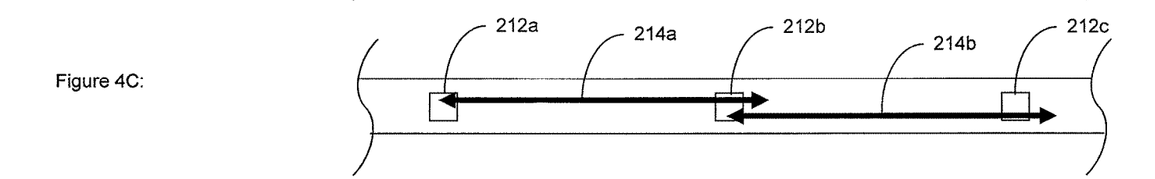

For still another example, as schematically shown in FIG. 4C, the continuous survey 214a comprising continuous survey measurements 216 taken between the pair of stationary survey measurements 212a, 212b spans across (e.g., includes) the location of the stationary survey measurement 212b, the continuous survey 214b comprising continuous survey measurements 216 taken between the pair of stationary survey measurements 212b, 212c spans across (e.g., includes) the location of the stationary survey measurement 212c, and the continuous survey 214a and the continuous survey 214b at least partially overlap one another. At least some of the continuous survey measurements 216 of the continuous survey 214a can also be continuous survey measurements 216 of the continuous survey 214b (e.g., some continuous survey measurements 216 can be included in two or more continuous surveys 214).

Figure 4D:
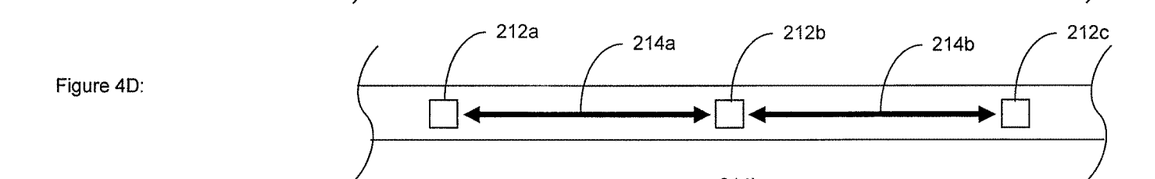

In certain embodiments, the at least one continuous survey 214 comprising continuous survey measurements 216 taken between the pair of stationary survey measurements 212 spans across (e.g., includes) the locations of none of the stationary survey measurements 212 of the plurality of stationary survey measurements 212 (e.g., there are no stationary survey measurements 212 between the pair of stationary survey measurements 212 at either end of the continuous survey 214). For example, as schematically shown in FIG. 4D, the continuous survey 214a comprising continuous survey measurements 216 taken between the pair of stationary survey measurements 212a, 212b does not span across (e.g., include) a location of a stationary survey measurement 212, and the continuous survey 214b comprising continuous survey measurements 216 taken between the pair of stationary survey measurements 212b, 212c does not span across (e.g., include) a location of a stationary survey measurement 212.

Figure 4E:
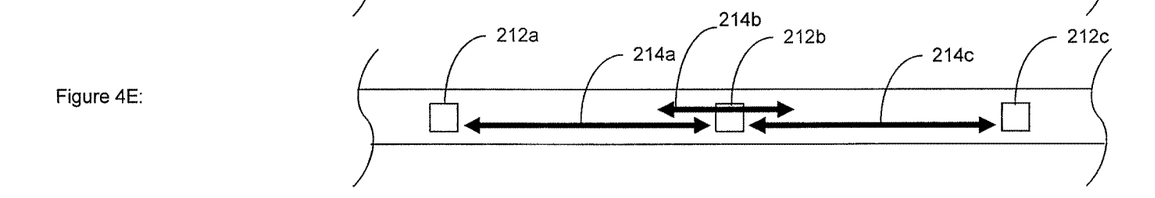

In certain embodiments, various combinations of continuous surveys 214 may be taken. For example, as schematically illustrated in FIG. 4E, the continuous survey 214a is between the pair of stationary survey measurements 212a, 212b without spanning across the locations of other stationary survey measurements 212, the continuous survey 214b is between the pair of stationary survey measurements 212a, 212c and spans across (e.g., includes) the location of the stationary survey measurement 212b, and the continuous survey 214c is between the pair of stationary survey measurements 212b, 212c without spanning across the locations of other stationary survey measurements 212. Other combinations of continuous surveys 214 may also be taken in accordance with certain embodiments described herein.

Figure 5A:
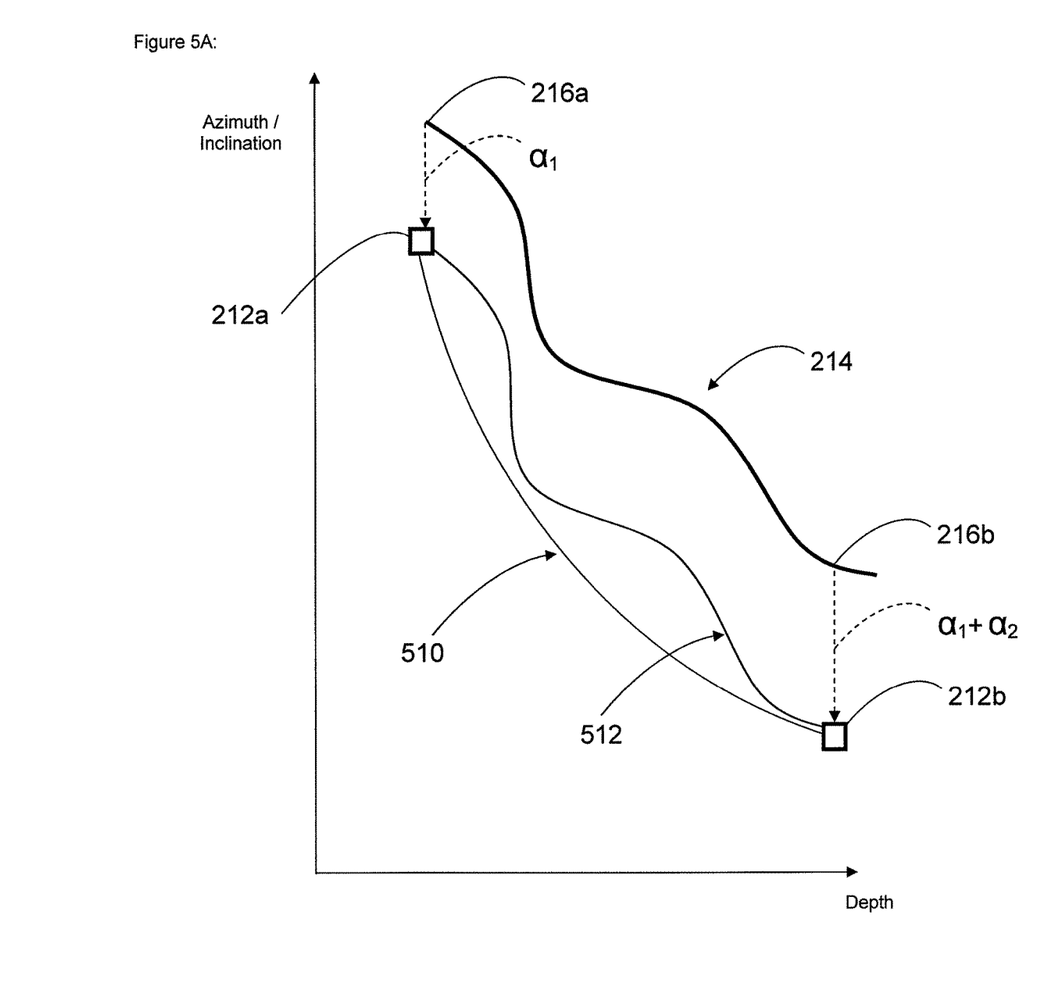
FIG. 5A schematically illustrates an example process for combining the plurality of stationary survey measurements and the plurality of continuous survey measurements to produce a continuous survey of the previously drilled portion of the wellbore in accordance with certain embodiments described herein.
Figure 5B:
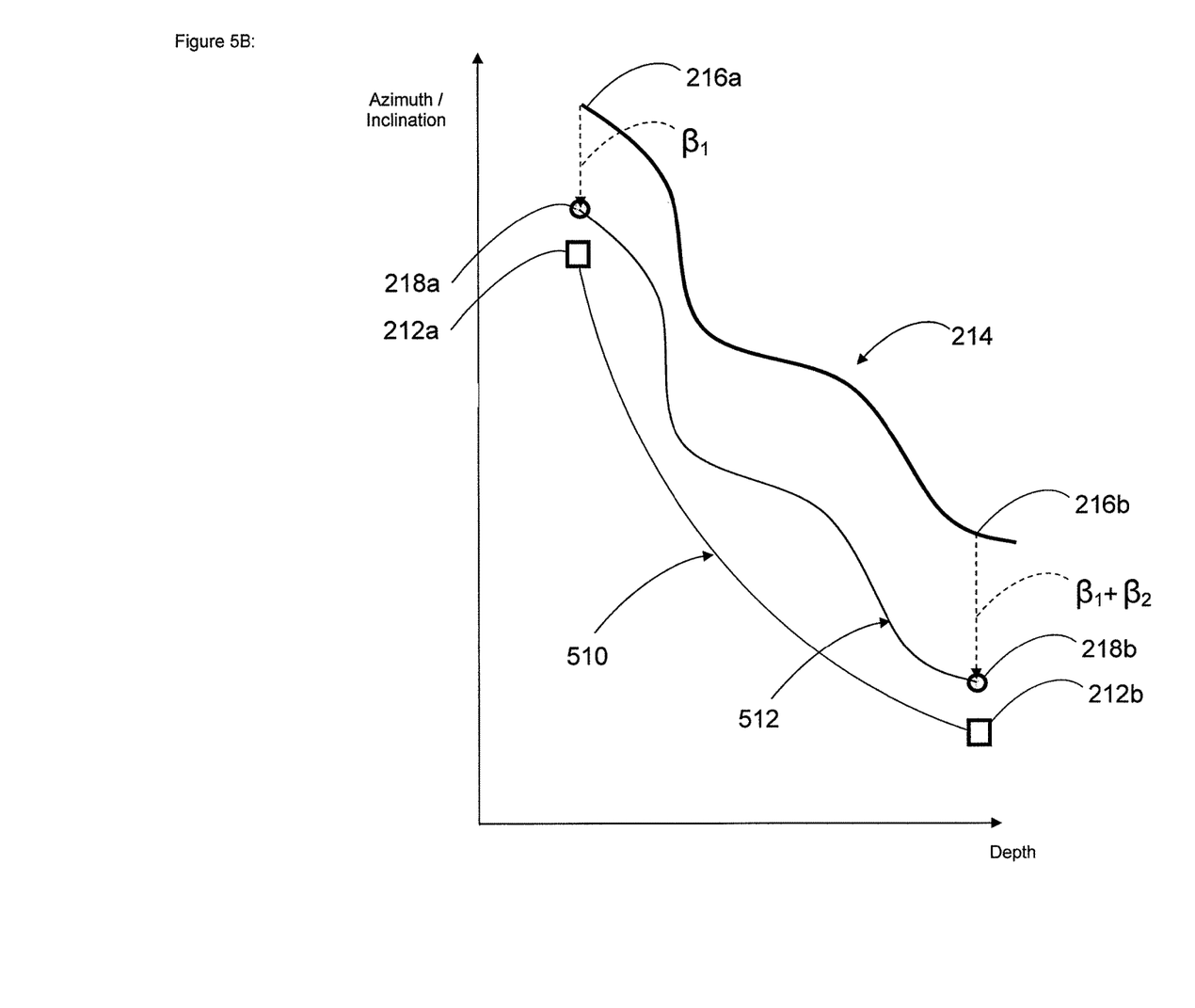
FIG. 5B schematically illustrates another example process for combining the plurality of stationary survey measurements and the plurality of continuous survey measurements to produce a continuous survey of the previously drilled portion of the wellbore in accordance with certain embodiments described herein.

FIGS. 5A and 5B schematically illustrate example processes for combining the plurality of stationary survey measurements 212 and the plurality of continuous survey measurements 216 to produce a continuous survey of the previously drilled portion of the wellbore in accordance with certain embodiments described herein. FIGS. 5A and 5B schematically show a plot of azimuth/inclination versus depth along the wellbore for survey measurements taken during an inrun survey. A pair of stationary survey measurements 212a, 212b (e.g., gyrocompassing survey measurements of azimuth and inclination taken at two different depths along the wellbore) are shown as squares, and a continuous survey 214 comprising a plurality of continuous survey measurements 216 between the stationary survey measurements 212a, 212b is shown as a solid line. The continuous survey 214 spans across (e.g., includes) the location of the stationary survey measurement 212b. A curve fitted to the two stationary survey measurements 212a, 212b by a minimum curvature method is shown by solid line 510, and a combined survey produced by combining the two stationary survey measurements 212a, 212b and the continuous survey measurements 216 of the continuous survey 214 is shown by solid line 512. As can be seen in FIGS. 5A and 5B, the combined survey 512 provides information regarding the tortuosity of the wellbore between the two stationary survey measurements 212a, 212b, while the curve 510 fitted to the two stationary survey measurements 212 contains no such information.

In certain embodiments, the pair of stationary survey measurements 212a, 212b can be used as the start point, the end point, or both for the range of continuous survey measurements 216 to be combined with the stationary survey measurements 212. This process can include adjusting the continuous survey measurements 216, which can comprise reducing (e.g., eliminating) a difference between at least one of the stationary survey measurements 212 of the pair of stationary survey measurements 212 and the continuous survey measurements 216 at the depth of the at least one of the stationary survey measurements 212. Each stationary survey measurement 212 can be used as the start point for the next continuous survey 214, and each segment of the continuous survey 216 can be appropriately adjusted and inserted between the corresponding pair of stationary survey measurements 212 to provide a combined survey. In certain such embodiments, the continuous survey measurements 216 can be adjusted by applying an offset to the continuous survey measurements 216 at depths at or between the stationary survey measurement 212a and the stationary survey measurement 212b. In this way, the continuous survey measurement 216a (e.g., the start point of the continuous survey 214) taken at the depth of the stationary survey measurements 212a can be aligned with the stationary survey measurement 212a. In certain embodiments, rather than having at least some of the adjusted continuous survey measurements 216 be at the same depth as the stationary survey measurements 212, adjusting the continuous survey measurements 216 can comprise reducing (e.g., eliminating) a difference between at least one of the stationary survey measurements 212 of the pair of stationary survey measurements 212 and the continuous survey measurements 216 at a depth within a predetermined distance (e.g., within one foot, within five feet, within ten feet, within 10% of a length of a pipe of the wellbore) from the depth of the at least one of the stationary survey measurements 212.

The continuous survey data can be adjusted accordingly, in one or both of the inclination and azimuth readings. For example, as schematically illustrated in FIG. 5A, the start point 216a of the continuous survey data can be offset (e.g., shifted up or down by applying an offset) by a first amount ($\alpha_1$) such that the start point 216a of the continuous survey data is coincident with one stationary survey measurement 212a. The end point 216b of the continuous survey data can be offset (e.g., shifted up or down by applying an offset) by a second amount ($\alpha_1 + \alpha_2$) such that the end point 216b is coincident with the other stationary survey measurement 212b. The individual measurements of the continuous survey data between the start point 216a and the end point 216b can then each be offset (e.g., shifted up or down by applying an offset) by a third amount calculated from an interpolation of the first amount and the second amount that is proportional to the distance of the depth of the individual measurement to the depths of the start point 216a and the end point 216b. For another example, the continuous survey data can be rigidly shifted up or down by a first amount such that the start point 216a is coincident with the one stationary survey measurement 212a, and the remaining measurements of the continuous survey data can then be rigidly rotated about the one stationary survey measurement 212a (e.g., rotated about the start point 216a in FIG. 5A such that the continuous survey data maintains its shape) until the end point 216b of the continuous survey data coincides with or is within a predetermined amount from the other stationary survey measurement 212b.

In certain embodiments, the stationary survey measurements 212 and the continuous survey measurements 216 collected over each wellbore section between successive stationary survey depths may be combined together by first computing a weighted average 218a of the start points 212a, 216a and a weighted average 218b of the end points 212b, 216b for the stationary survey measurements 212 and the continuous survey measurements 216 (e.g., for both inclination and azimuth). The weighting factors used can be based on representative error models for the two survey tools used to make these measurements. In configurations in which the stationary survey data is collected using a significantly higher performance gyro system than that used for collecting the continuous survey data, the weighted averages 218a, 218b of the start and end points can coincide closely with the start and end points 212a, 212b of the stationary survey measurements 212.

Once new start and end points 218a, 218b are defined for the wellbore section under consideration, the continuous survey data can be adjusted accordingly, in one or both of the inclination and azimuth readings. For example, as schematically illustrated in FIG. 5B, the start point 216a of the continuous survey data can be offset (e.g., shifted up or down by applying an offset) by a first amount ($\beta_1$) such that the start point 216a of the continuous survey data is coincident with the weighted average start point 218a. The end point 216b of the continuous survey data can be offset (e.g., shifted up or down by applying an offset) by a second amount ($\beta_1+\beta_2$) such that the end point 216b is coincident with the weighted average end point 218b. The individual measurements of the continuous survey data between the start point 216a and the end point 216b can then be offset (e.g., shifted up or down by applying an offset) by a third amount calculated from an interpolation of the first amount and the second amount that is proportional to the distance of the depth of the individual measurement to the depths of the start point 216a and the end point 216b. For another example, the continuous survey data can be rigidly shifted up or down by a first amount such that the start point 216a is coincident with the weighted average start point 218a, and the remaining measurements of the continuous survey data can then be rigidly rotated about the weighted average start point 218a (e.g., rotated about the weighted average start point 218a in FIG. 5B such that the continuous survey data maintains its shape) until the end point 216b of the continuous survey data coincides with or is within a predetermined amount from the weighted average end point 218b.

In certain embodiments, the at least one gyroscopic sensor module 122b dedicated to continuous survey measurements can include lower-grade gyroscopic sensors that are significantly susceptible to bias errors (e.g., errors in azimuth, inclination, or both). At locations in which the at least one survey tool 120 has stopped to conduct one or more stationary survey measurements 212 (e.g., at the location of stationary survey measurement 212a of FIGS. 5A and 5B), a comparison can be made (e.g., by the at least one processor 130 of the computer system) between the angular rates measured by the at least one gyroscopic sensor module 122a dedicated to stationary survey measurements and the at least one gyroscopic sensor module 122b dedicated to continuous survey measurements. Differences between the respective x-, y-, and z-axis measurements of these gyroscopic sensor modules 122a, 122b can be assumed to arise as a result of bias errors in the lower-grade sensors of the at least one gyroscopic sensor module 122b dedicated to continuous survey measurements. Based on this assumption, the measurement differences can be interpreted as errors in the lower-grade sensors and corrections can be applied accordingly (e.g., by applying an offset to the continuous survey 214, as shown in FIGS. 5A and 5B).

Figure 6:
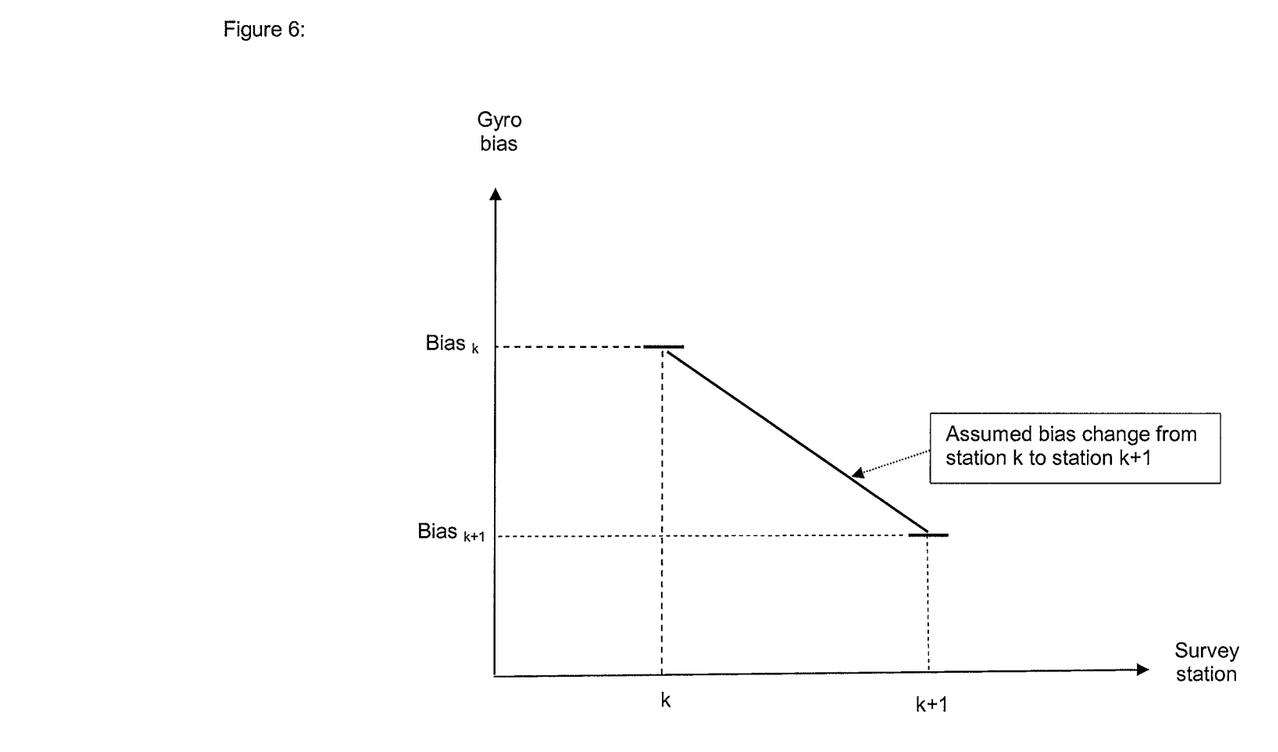
FIG. 6 schematically illustrates an example process for correcting the continuous survey for bias errors in accordance with certain embodiments described herein.

In certain embodiments, the process of correcting the continuous survey 214 can be extended to account for changes in the bias errors of the lower-grade sensors of the at least one gyroscopic sensor module 122b dedicated to continuous survey measurements. FIG. 6 schematically illustrates an example process for correcting the continuous survey 214 for bias errors in accordance with certain embodiments described herein. For example, the bias error can be assumed to have changed between a starting point of a continuous survey 214 and an ending point of the continuous survey 214 by a predetermined relationship (e.g., a linear change). The continuous survey measurements 216 taken at adjacent survey stations (e.g., adjacent locations of the stationary survey measurements 212 which can be considered to be the location of survey station k and the location of survey station k+1) can be compared to these stationary survey measurements 212 to determine the bias errors (e.g., bias errors in azimuth, inclination, or both) of the continuous survey measurements 216 at these adjacent survey station locations (e.g., bias errors $bias_k$ and $bias_{k+1}$). The bias errors for the continuous survey measurements 216 at the locations between these two survey station locations can be assumed to have changed by a predetermined relationship (e.g., linear). The interpolated bias errors can be calculated using this predetermined relationship at locations between the pair of stationary survey measurements 212 (e.g., between the locations of survey station k and survey station k+1). The bias errors for the continuous survey measurements 216 at the locations between the two survey station locations can be corrected by applying offsets to correct for the interpolated bias errors. Such corrections can be made for each continuous survey 214 taken along the wellbore.

In certain embodiments, additional adjustments can be made to the continuous survey 214 to combine it with the pair of stationary survey measurements 212 in a self-consistent manner.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out completely (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary tangible, computer-readable storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method, comprising:
    receiving a plurality of stationary survey measurements taken at a corresponding plurality of locations along a portion of a wellbore;
    receiving at least one continuous survey comprising a plurality of continuous survey measurements taken along the portion of the wellbore and between a pair of stationary survey measurements of the plurality of stationary survey measurements;
    producing a continuous survey of the portion of the wellbore by combining the plurality of stationary survey measurements and the plurality of continuous survey measurements;
    determining a tortuosity of the wellbore between the plurality of stationary survey measurements from the continuous survey;
    providing steering and/or positioning information for production and/or completion equipment based on the determined tortuosity; and
    placing, or providing assistance to the placement of, the production and/or completion equipment inside the wellbore based on the steering and/or positioning information.

2. The method of claim 1, wherein combining the plurality of stationary survey measurements and the plurality of continuous survey measurements comprises using a computer system comprising at least one processor.

3. The method of claim 1, wherein the pair of stationary survey measurements are spaced from one another by a distance along the wellbore in a range of 30 feet to 270 feet.

4. The method of claim 1, wherein the at least one continuous survey spans across a location of at least one stationary survey measurement of the plurality of stationary survey measurements.

5. The method of claim 1, wherein the at least one continuous survey includes the locations of the pair of stationary survey measurements.

6. The method of claim 1, wherein the at least one continuous survey comprises a plurality of continuous surveys that at least partially overlap one another.

7. The method of claim 1, wherein receiving the plurality of stationary survey measurements comprises taking the plurality of stationary survey measurements during an outrun survey of the wellbore.

8. The method of claim 1, wherein receiving the at least one continuous survey comprises taking the at least one continuous survey during an outrun survey of the wellbore.

9. The method of claim 1, further comprising receiving at least one continuous survey comprising a plurality of continuous survey measurements taken across one or more of the corresponding plurality of locations.

10. The method of claim 1, wherein receiving the plurality of stationary survey measurements comprises taking the plurality of stationary survey measurements using at least one survey tool.

11. The method of claim 10, wherein the at least one survey tool comprises a wireline survey tool, a slick line survey tool, or a drop survey tool.

12. The method of claim 1, wherein combining the plurality of stationary survey measurements and the plurality of continuous survey measurements comprises adjusting the continuous survey measurements to reduce a difference between at least one of the stationary survey measurements of the pair of stationary survey measurements and the continuous survey measurements at a depth of the at least one of the stationary survey measurements.

13. The method of claim 12, wherein adjusting the continuous survey measurements comprises applying an offset to the continuous survey measurements.

14. The method of claim 12, wherein adjusting the continuous survey measurements comprises determining bias errors at the locations of the pair of stationary survey measurements, calculating interpolated bias errors at locations between the pair of stationary survey measurements, and applying offsets to the continuous survey measurements to correct for the interpolated bias errors.

15. The method of claim 1, wherein receiving the at least one continuous survey comprises taking the at least one continuous survey using at least one survey tool.

16. The method of claim 15, wherein the at least one survey tool comprises a wireline survey tool, a slick line survey tool, or a drop survey tool.

17. The method of claim 15, wherein the at least one survey tool comprises a measurement-while-drilling (MWD) survey tool.

18. The method of claim 15, wherein the plurality of continuous survey measurements is taken while the at least one survey tool is moved downward along the wellbore.

19. The method of claim 15, wherein the plurality of continuous survey measurements is taken while the at least one survey tool is moved upward along the wellbore.

20. The method of claim 15, wherein the plurality of continuous survey measurements is taken:
while the at least one survey tool is moved downward along the wellbore; and
while the at least one survey tool is moved upward along the wellbore.

21. The method of claim 15, wherein the at least one survey tool comprises at least one gyroscopic sensor module and at least one measurement-while-drilling sensor.

22. The method of claim 15, wherein the at least one survey tool comprises at least one gyroscopic sensor module.

23. The method of claim 22, wherein the at least one gyroscopic sensor module comprises at least one gyroscopic sensor module dedicated to performing the plurality of stationary survey measurements and at least one gyroscopic sensor module dedicated to performing the at least one continuous survey.

24. A method, comprising:
receiving from at least one survey tool a plurality of stationary survey measurements taken at a corresponding plurality of locations along a portion of a wellbore;
receiving from the at least one survey tool at least one continuous survey comprising a plurality of continuous survey measurements taken along the portion of the wellbore and between a pair of stationary survey measurements of the plurality of stationary survey measurements;
producing a continuous survey of the portion of the wellbore by combining the plurality of stationary survey measurements and the plurality of continuous survey measurements;
determining a tortuosity of the wellbore between the plurality of stationary survey measurements from the continuous survey;
providing steering and/or positioning information for production and/or completion equipment based on the determined tortuosity; and
placing, or providing assistance to the placement of, the production and/or completion equipment inside the wellbore based on the steering and/or positioning information.

* * * * *